Figure 1:
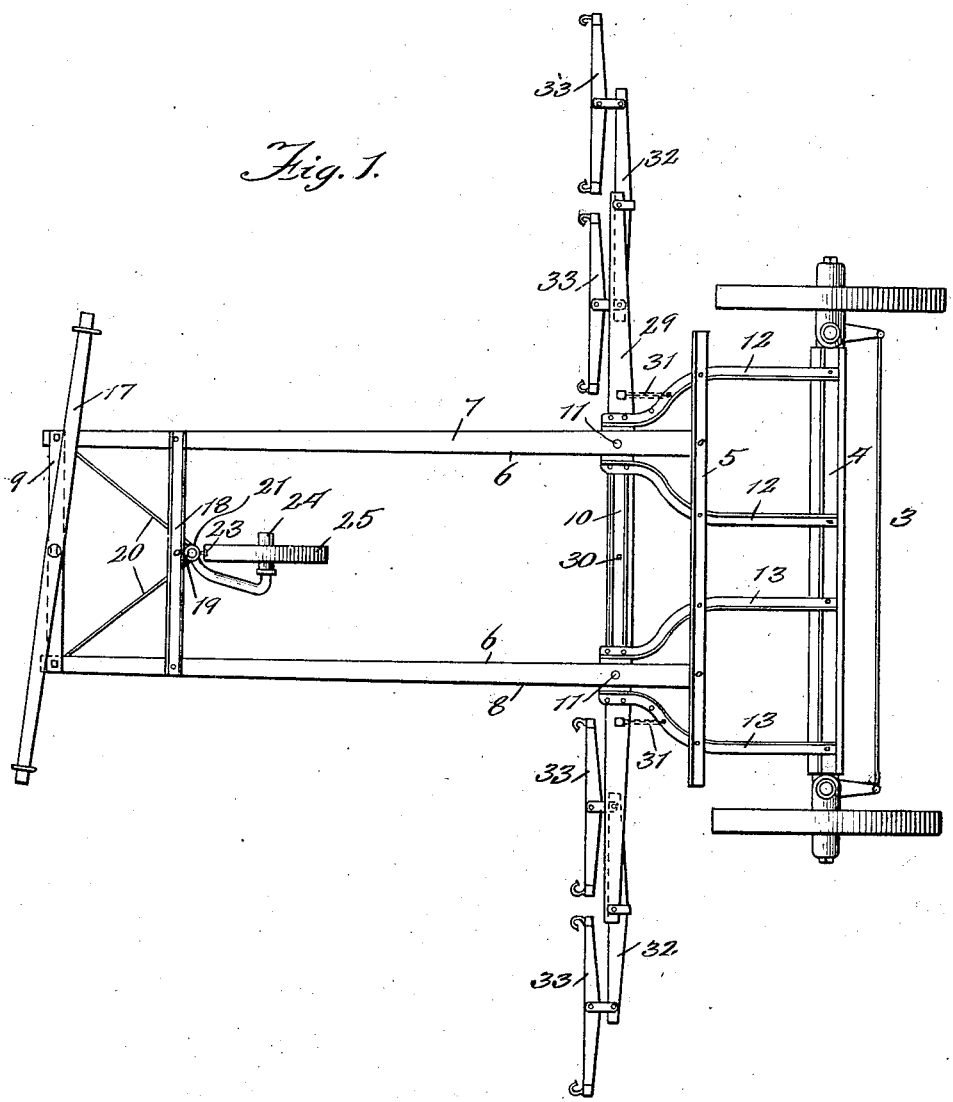

W. H. JOSEPH.
FOUR-HORSE BALANCE HITCH.
APPLICATION FILED SEPT. 2, 1911.

1,087,663.

Patented Feb. 17, 1914.

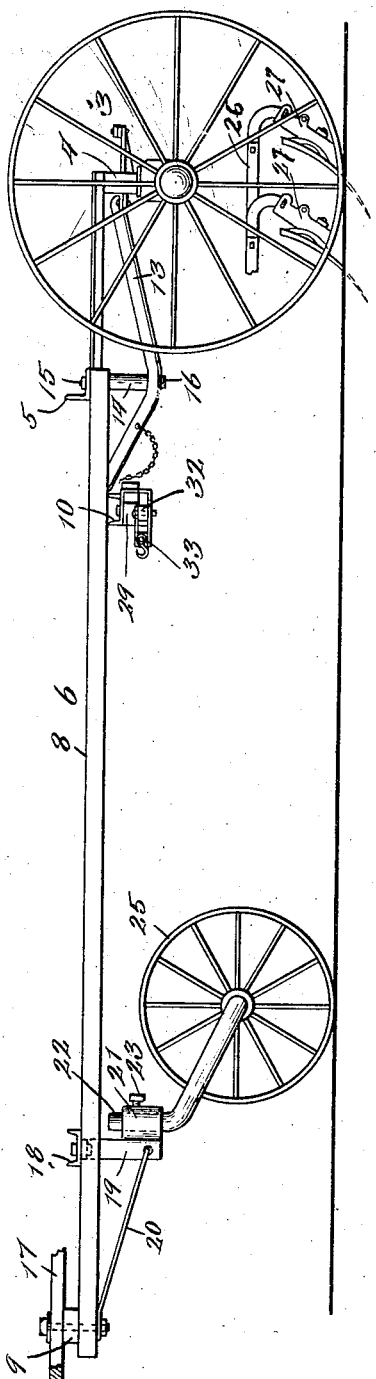

UNITED STATES PATENT OFFICE.

WILLIAM H. JOSEPH, OF TUSCOLA, ILLINOIS, ASSIGNOR TO SEARS, ROEBUCK AND COMPANY, OF CHICAGO, ILLINOIS, A CORPORATION OF NEW YORK.

FOUR-HORSE BALANCE-HITCH.

1,087,663.  Specification of Letters Patent.  Patented Feb. 17, 1914.

Application filed September 2, 1911. Serial No. 647,421.

*To all whom it may concern:*

Be it known that I, WILLIAM H. JOSEPH, a citizen of the United States, residing at Tuscola, in the county of Douglas and State of Illinois, have invented certain new and useful Improvements in Four-Horse Balance-Hitches, of which the following is a specification, reference being had to the accompanying drawings.

My invention relates to a four-horse balance hitch particularly adapted for two-row cultivators and similar wheeled vehicles. Its object is to provide a new and improved hitch in which the horses are relieved of the entire weight and by which side jerking and whipping are avoided.

It has for another object the providing of such a hitch which will aid the driver in guiding the cultivator and will act very sensitively with the slightest pressure of the foot on either beam by the driver.

It has for another object the providing of such a hitch which will cause the shovels to run at a set depth so that they will not vary in their depth by any up and down oscillation of the tongue. I accomplish this object as illustrated in the drawings and as hereinafter described.

What I regard as new is set forth in the claims.

In the accompanying drawings,—Figure 1 is a top or plan view; and Fig. 2 is a side elevation.

Referring to the drawings,—3 indicates a cultivator having a frame provided with cross-bars 4 and 5. The cultivator may be of any well-known two-row type, and for that reason is shown only conventionally in order not to encumber the drawings with illustrations of unnecessary parts.

6 indicates a rigid frame, which is composed of beams or tongues 7—8, a cross-bar 9 secured to the front ends of the beams 7 and 8, and a cross-bar 10 secured in any suitable manner, as by bolts 11, near the rear ends of the beams 7 and 8. The rear ends of the beams 7 and 8 are bolted, or otherwise secured, to the cross-bar 5.

12—12 and 13—13 indicate braces, the rear ends of which are bolted, or otherwise secured, to the rear cross-bar 4 of the cultivator frame. The beams bend forward at their forward ends so that the braces 12 at their forward ends lie close along the side of the beam 7, to which they are secured by bolts or in other suitable manner; and similarly the forward ends of the braces 13 are secured to the sides of the beam 8. As is best shown in Fig. 2, the braces 12 and 13 are of truss shape in order to strengthen the structure and connection with the cultivator frame.

14 indicates blocks, which span the distance between the cross-bar 5 of the cultivator frame and the lowest portion of the truss-like structure of the braces 12 and 13 and are secured thereto by suitable bolts, as 15—16.

17 indicates a neck-yoke, which is pivotally connected to the forward cross-bar 9 of the frame.

18 indicates a cross-bar, to which is secured a suitable block 19 which is secured in position by braces 20. The block 19 is provided with a sleeve 21, through which passes a caster-wheel support 22 and which is adjustably mounted therein by means of a set-screw 23. The lower end of the caster-wheel support 22 extends diagonally downward and backward and is provided with a journal 24 at its end upon which is mounted a caster-wheel 25.

The caster-wheel, adjusted properly by the adjustment of the caster-wheel support 22, supports the forward end of the frame and holds it rigidly at a suitable height, whereby the horses are relieved from the weight of the neck-yoke, and a firm structure is produced which, preventing any upward or downward oscillation of the frame, will carry the cultivator beams 26 with their shovels 27 at an even depth in the ground when they are once adjusted in the usual manner for plowing. The cultivator beams 26 are only conventionally illustrated and are shown as broken away in order not to encumber the drawings with unnecessary illustration, as they may be of any well-known type and form of themselves no part of my present invention. It will be understood, of course, that they are carried by the cultivator frame in any well-known approved manner.

29 indicates an evener bar, which is centrally pivoted by a pivot, as 30, to the rear cross-bar 10 of the frame 6.

31 indicates stay-chains, which are secured at one end to the evener bar 29 and at the other end to the braces 12—13, and, as is best shown in Fig. 2, the chains have sufficient slack to permit the evener to oscillate through a limited arc horizontally upon its pivot.

32 indicates double-trees, which are pivotally mounted in the usual manner near the ends of the evener 29. 33 indicates swingletrees, which are pivotally connected in the usual manner to the ends of the doubletrees 32.

It will be noted that by means of the above-described devices I have provided a hitch which will cause the shovels to run at a uniform depth, because any up and down oscillation of the frame is prevented by reason of its running at its front end upon a caster-wheel which preserves the front end at a uniform fixed distance from the ground. It therefore relieves the necks of the horses from the weight of the frame. Inasmuch as the tongues are supported by the casterwheel and there is no weight upon the cultivator beams and shovels except their own weight, this construction allows the cultivator shovels to be moved more readily from side to side by the pressure of the foot of the driver applied in the usual manner.

It will be obvious that I provide a straight high hitch for the horses which does not interfere with the guiding of the cultivator, and a device is provided by which the machine may be very readily turned in the field.

That which I claim as my invention, and desire to secure by Letters Patent, is,—

A draft gear for agricultural implements comprising a wheeled frame, a pair of forwardly-extending bars secured at the rear to said frame, an evener and draft devices carried adjacent to the rear end portions of said bars, a neck yoke supported by said bars adjacent to their front ends, and a caster wheel mounted between said bars near their forward ends for supporting the same, whereby the caster wheel does not interfere with the team.

WILLIAM H. JOSEPH.

Witnesses:
R. J. N. JOHNSON,
W. THOS. COLEMAN.